United States Patent
Hayes et al.

(10) Patent No.: US 9,803,695 B2
(45) Date of Patent: Oct. 31, 2017

(54) DRIVE SHAFT LOCKING CAP AND RELATED MIXING SYSTEM AND METHOD

(71) Applicant: LIFE TECHNOLOGIES CORPORATION, Carlsbad, CA (US)

(72) Inventors: Mark Hayes, Smithfiled, UT (US); Jeffery Hurd, Logan, UT (US); Steven R. Kjar, Logan, UT (US); Whitt F. Woods, Logan, UT (US)

(73) Assignee: Life Technologies Corporation, Carlsbad, CA (US)

( * ) Notice: Subject to any disclaimer, the term of this patent is extended or adjusted under 35 U.S.C. 154(b) by 581 days.

(21) Appl. No.: 14/330,896

(22) Filed: Jul. 14, 2014

(65) Prior Publication Data

US 2016/0008776 A1  Jan. 14, 2016

(51) Int. Cl.
*F16D 1/108* (2006.01)
*F16D 1/02* (2006.01)
(Continued)

(52) U.S. Cl.
CPC ............ *F16D 1/02* (2013.01); *B01F 7/00341* (2013.01); *B01F 7/00725* (2013.01);
(Continued)

(58) Field of Classification Search
CPC . F16D 1/02; F16D 1/033; F16D 1/076; F16D 1/08; F16D 1/04; F16D 1/0829;
(Continued)

(56) References Cited

U.S. PATENT DOCUMENTS 7,384,783 B2  6/2008  Kunas et al.
7,682,067 B2  3/2010  West et al.
(Continued)

FOREIGN PATENT DOCUMENTS

EP  0 978 485 A1  2/2000
GB  810744 A  *  3/1959  .............. F16D 1/10
(Continued)

OTHER PUBLICATIONS

International Search Report and Written Opinion dated Sep. 21, 2015, issued in PCT Application No. PCT/US2015/039663, filed Jul. 9, 2015.

*Primary Examiner* — Timothy Cleveland
(74) *Attorney, Agent, or Firm* — Workman Nydegger

(57) ABSTRACT

A mixing system includes a housing having a motor mount rotatably coupled thereto, the motor mount having a passage extending therethrough. A drive shaft is removably positioned within the passage of the motor mount. A cap includes a main body removably coupled to the motor mount and an actuator coupled to the main body so as to be pivotable between a first position and a second position with respect to the main body. The actuator producing a camming action when the actuator is pivoted such that when the actuator is in the first position, the actuator pushes the drive shaft against the motor mount so that the main body is locked to the motor mount and so that rotation of the motor mount causes rotation of the drive shaft and when the actuator is in the second position, the actuator is disengaged from the drive shaft and the cap is removable from the motor mount.

13 Claims, 13 Drawing Sheets

(51) Int. Cl.
| | |
|---|---|
| *B01F 15/00* | (2006.01) |
| *B01F 7/00* | (2006.01) |
| *F16D 1/033* | (2006.01) |
| *F16D 1/04* | (2006.01) |
| *F16D 1/076* | (2006.01) |
| *F16D 1/08* | (2006.01) |

(52) U.S. Cl.
CPC .......... *B01F 15/0085* (2013.01); *F16D 1/033* (2013.01); *F16D 1/04* (2013.01); *F16D 1/076* (2013.01); *F16D 1/08* (2013.01); *F16D 1/108* (2013.01); *B01F 2015/00642* (2013.01)

(58) Field of Classification Search
CPC .......... F16D 1/0841; F16D 1/10; F16D 1/101; F16D 1/104; F16D 1/108; F16D 1/112; B01F 7/00725; B01F 7/00341
See application file for complete search history.

(56) References Cited

U.S. PATENT DOCUMENTS

| | | |
|---|---|---|
| 7,879,599 B2 | 2/2011 | Goodwin et al. |
| 8,455,242 B2 | 6/2013 | Staheli et al. |
| 8,506,198 B2 | 8/2013 | West et al. |
| 2004/0196735 A1 | 10/2004 | Barker et al. |
| 2011/0310696 A1 | 12/2011 | Goodwin et al. |
| 2013/0101982 A1 | 4/2013 | Goodwin et al. |

FOREIGN PATENT DOCUMENTS

| | | |
|---|---|---|
| WO | 98/40157 | 9/1998 |
| WO | 2013/151733 A1 | 10/2013 |

\* cited by examiner

DRIVE SHAFT LOCKING CAP AND RELATED MIXING SYSTEM AND METHOD

BACKGROUND OF THE INVENTION

1. The Field of the Invention

The present invention generally relates to a cap that removably secures one device to another. In particular, embodiments relate to devices, systems and methods for pushing a drive shaft against a motor mount using a cap such that rotation of the motor mount causes rotation of the drive shaft while the cap is locked to the motor mount.

2. The Related Technology

Bioreactors are commonly used by the biopharmaceutical industry to grow cells and microorganisms. A typical bioreactor comprises a container in which the cells or microorganisms are contained. A mixing system is used to suspend and mix the components. For this purpose, an impeller is positioned in the container. A drive shaft extends from the impeller to a motor positioned outside of the container. The motor rotates the drive shaft which rotates the impeller. Examples of such systems are described in U.S. Pat. No. 7,682,067, issued Mar. 23, 2010.

In one embodiment, the drive shaft is removably secured to a motor mount which is rotated by the motor. A retention cap is used to secure the drive shaft to the motor mount. The retention cap and the motor mount are threaded so that the retention cap can be screwed onto the motor mount to be secured thereto. When secured to the motor mount, the retention cap causes the drive shaft to be secured to the motor mount so that the drive shaft rotates with the motor mount. By being secured to the motor mount, the retention cap also rotates therewith. A safety cap is positioned over the retention cap and secured to the body of the motor to make the system safer. Unlike the retention cap, the safety cap does not rotate with the motor mount.

To remove the drive shaft from the motor, the safety cap is first detached from the body of the motor and removed. The retention cap is then unscrewed from the motor mount and removed therefrom. The drive shaft can then be removed from the motor mount.

Although the above mixing system solves many problems of earlier mixing systems, it also has some problems of its own, especially with respect to the retention cap and the manner in which the drive shaft is secured to the motor. For example, if the threads on the retention cap and the motor mount are misaligned when the retention cap is screwed onto the motor mount, the threads can be damaged requiring replacement of the retention cap and/or the motor mount.

Furthermore, depending on the operator, different forces can be used each time the retention cap is screwed onto the motor mount. As such, it can be unclear how well the retention cap is secured to the motor mount. As noted above, the retention cap rotates with the motor mount when secured thereto. Rotation of the motor mount can cause vibrations to occur in the retention cap. If the cap is not properly tightened, these vibrations can potentially cause the cap to slowly unthread from the motor mount, thereby potentially hampering operation of the system.

In addition, a specifically designed wrench is used to secure retention cap to the motor mount. The required wrench adds cost to the system and can impede operation of the system if the wrench is lost or misplaced.

Accordingly, what is needed are mixing systems that solve one or more of the above problems. The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element

DETAILED DESCRIPTION

Figure 1:
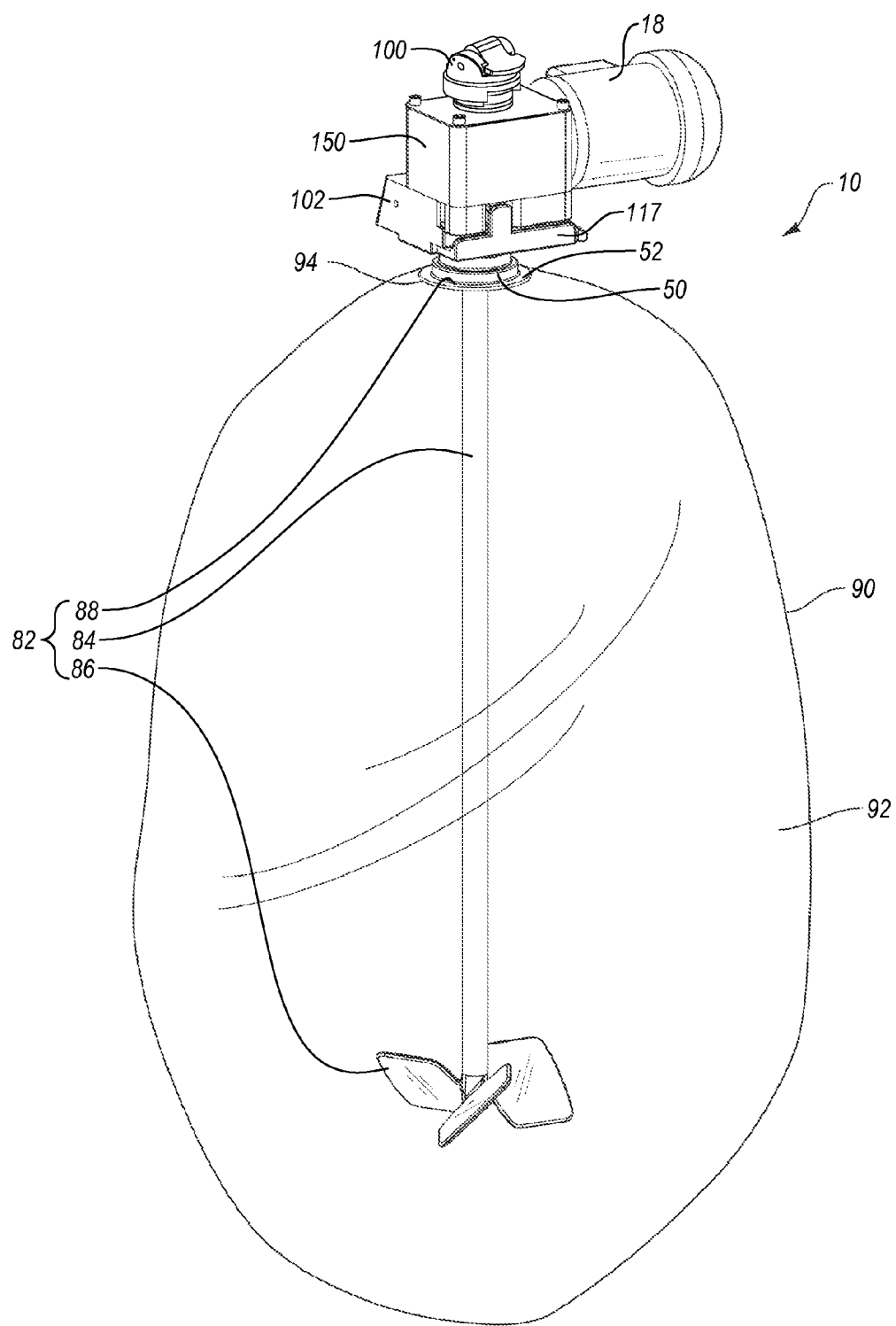
FIG. 1 is a perspective view of a mixing system incorporating features of the present invention.

In the following detailed description, reference is made to the accompanying drawings, which form a part hereof. In the drawings, similar symbols typically identify similar components, unless context dictates otherwise. The embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. It will also be understood that any reference to a first, second, etc. element in the claims or in the detailed description is not meant to imply numerical sequence, but is meant to distinguish one element from another unless explicitly noted otherwise.

In addition, as used in the specification and appended claims, directional terms, such as "top," "bottom," "up," "down," "upper," "lower," "proximal," "distal," "horizontal," "vertical," and the like are used herein solely to indicate relative directions and are not otherwise intended to limit the scope of the invention or claims.

The present application relates to devices, systems and methods for pushing a drive shaft against a motor mount using a cap such that rotation of the motor mount causes rotation of the drive shaft while the cap is locked to the motor mount in a press-locked manner. Such devices, systems and methods can be incorporated into a fluid mixing system. The present application also relates to a cap for removably securing a drive shaft to a motor mount so as to prevent the drive shaft from unintentionally disengaging from the motor mount during rotation of the motor mount. Embodiments of the present invention can solve many problems caused by caps used in conventional fluid mixing systems. For example, the caps disclosed herein can be easily attached to and detached from a motor mount without tools, have no threads that can be misaligned or otherwise damaged, are not subject to detachment due to motor vibrations, are secured to the motor mount using the same securing force each time, and are locked in place when the motor mount rotates.

Figure 2:
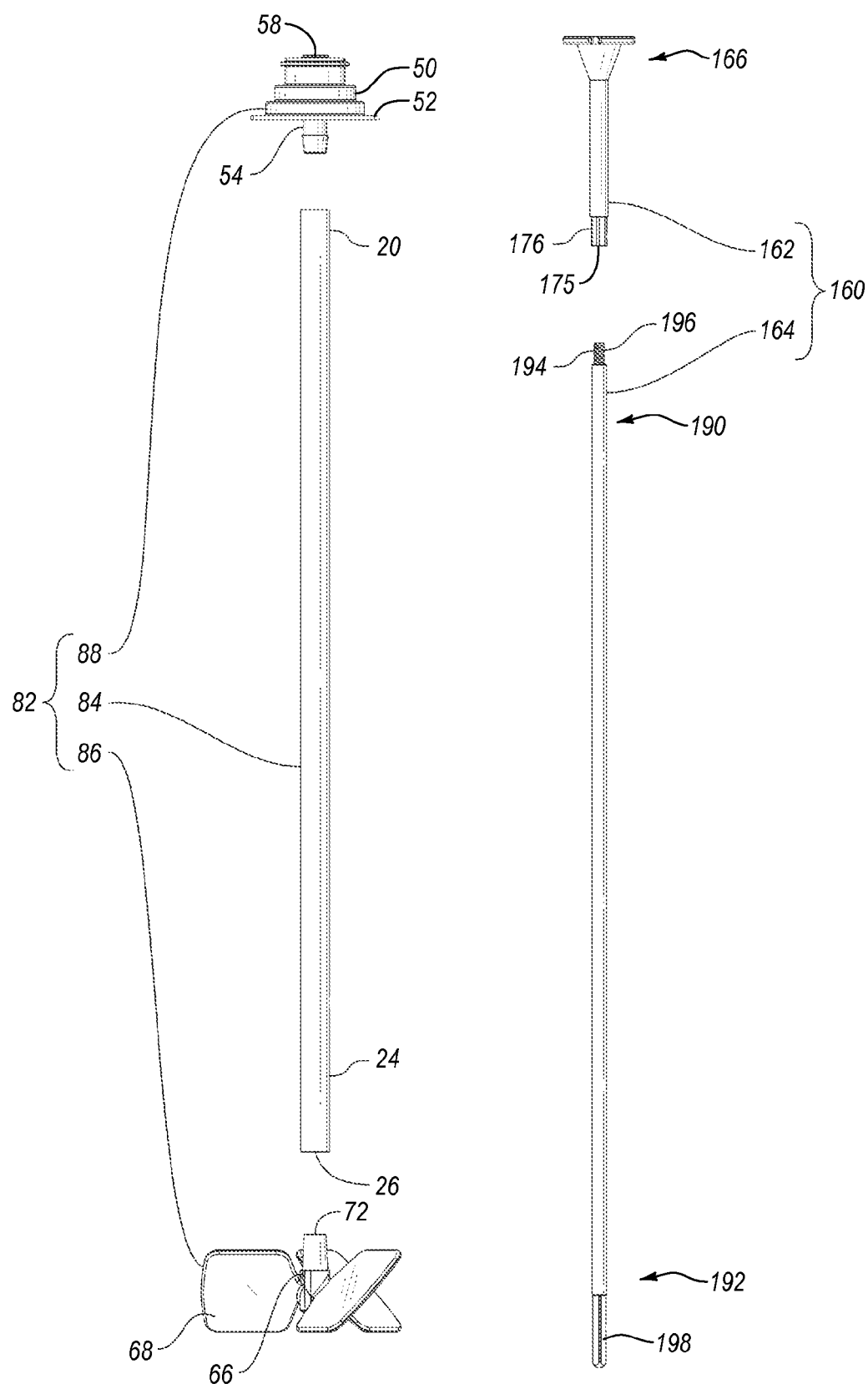
FIG. 2 is a partially exploded side view of an impeller assembly and drive shaft of the mixing system shown in FIG. 1.

Depicted in FIG. 1 is one embodiment of an inventive fluid mixing system 10 incorporating features of the present invention. Mixing system 10 can be used as a bioreactor or fermenter for culturing cells or microorganisms. Mixing system 10 can also be used in association with the formation and/or treatment of solutions and/or suspensions that are not biological but nevertheless incorporate mixing. For example, mixing system 10 and other embodiments disclosed herein can be used in the production of media, chemicals, food products, beverages, and other liquid products. In general, fluid mixing system 10 comprises a container 90, a motor assembly 150, an impeller assembly 82 and a drive shaft 160 (FIG. 2). The various components of mixing system 10 will now be discussed in further detail.

Container 90 has an interior surface that bounds a compartment 92 in which at least a portion of impeller assembly 82 is disposed. In the embodiment depicted, container 90 comprises a flexible bag. For example, container 90 can be comprised of a flexible, water impermeable material such as a low-density polyethylene or other polymeric sheets or film having a thickness in a range between about 0.1 mm to about 5 mm with about 0.2 mm to about 2 mm being more common. Other thicknesses can also be used. The material can be comprised of a single ply material or can comprise two or more layers. Container 90 can comprise a three-dimensional bag or a two-dimensional pillow style bag and can be sized to hold any desired volume.

Any desired number of ports can mounted on container 90 at any desired location for communicating with compartment 92. The ports can be coupled with fluid lines for delivering media, biological cultures, and/or other components into and out of container 12. The ports can also be used for coupling probes to container 90. For example, when container 90 is used as a bioreactor for growing cells or microorganisms, the ports can be used for coupling probes such as temperatures probes, pH probes, dissolved oxygen probes, and the like. As needed, a sparger can be coupled with container 90 for delivering a gas into compartment 92 of container 90. Where container 90 comprises a flexible bag, container 90 is typically supported within a rigid support housing. In alternative embodiments, container 90 can comprise other forms of collapsible or semi-rigid containers. Further information and alternative embodiments for container 90 and the ports, probes, spargers and support housing that can be used therewith are disclosed in U.S. Pat. No. 7,682,067, issued Mar. 23, 2010; U.S. Pat. No. 7,879,599, issued Feb. 1, 2011; and U.S. Pat. No. 8,506,198, issued Aug. 13, 2013, which are incorporated herein in their entirety by specific reference.

As depicted in FIG. 2, impeller assembly 82 comprises an elongated tubular connector 84 having a rotational assembly 88 mounted at one end and an impeller 86 mounted on the opposing end. More specifically, tubular connector 84 has a first end 20 and an opposing second end 24 with a passage 26 that extends therebetween. In one embodiment, tubular connector 84 comprises a flexible tube such as a polymeric tube. In other embodiments, tubular connector 84 can comprise a rigid tube or other tubular structure.

Rotational assembly 88 is mounted to first end 20 of tubular connector 84. Rotational assembly 88 comprises an outer casing 50 having an outwardly projecting annular sealing flange 52. A tubular hub 54 is rotatably disposed within outer casing 50. One or more bearing assemblies can be disposed between outer casing 50 and hub 54 to permit free and easy rotation of hub 54 relative to casing 50. Likewise, one or more seals can be formed between outer casing 50 and hub 54 so that during use an aseptic seal can be maintained between outer casing 50 and hub 54.

Hub 54 has an interior surface that bounds an opening 58 extending therethrough. The interior surface of hub 54 includes an engaging portion having a polygonal or other non-circular transverse cross section to engage with a driver 176 of drive shaft 160 (discussed below) so that when drive shaft 160 is passed through hub 54, rotation of drive shaft 160 facilitates rotation of hub 54 relative to outer casing 50.

Impeller 86 comprises a central hub 66 having a plurality of blades 68 radially outwardly projecting therefrom. Hub 66 engages with second end 24 of tubular connector 84 and bounds a blind socket 72 that is configured to receive drive shaft 160. Socket 72 also has an engaging portion having a polygonal or other non-circular transverse cross section to engage with a driver 154 of drive shaft 160. Accordingly, when driver shaft 160 is received within socket 72, rotation of drive shaft 160 facilities rotation of impeller 86.

Returning to FIG. 1, rotational assembly 88 is secured to container 90 by securing sealing flange 52 around the perimeter edge of an opening 94 formed at an upper end of container 90. Tubular connector 84 and impeller 86 extend into or are disposed within compartment 92 of container 90. In this configuration, outer casing 50 is fixed to container 90 but hub 54, and thus also tubular connector 84 and impeller 86, can freely rotate relative to outer casing 50 and container 90. As a result of rotational assembly 88 sealing opening 94, compartment 92 is sealed closed so that it can be sterilized and used in processing sterile fluids. Further disclosure on impeller assembly 82 and alternatives thereto are discloses in U.S. Pat. Nos. 7,682,067 and 8,506,198, which are incorporated herein by specific reference.

Figure 3:
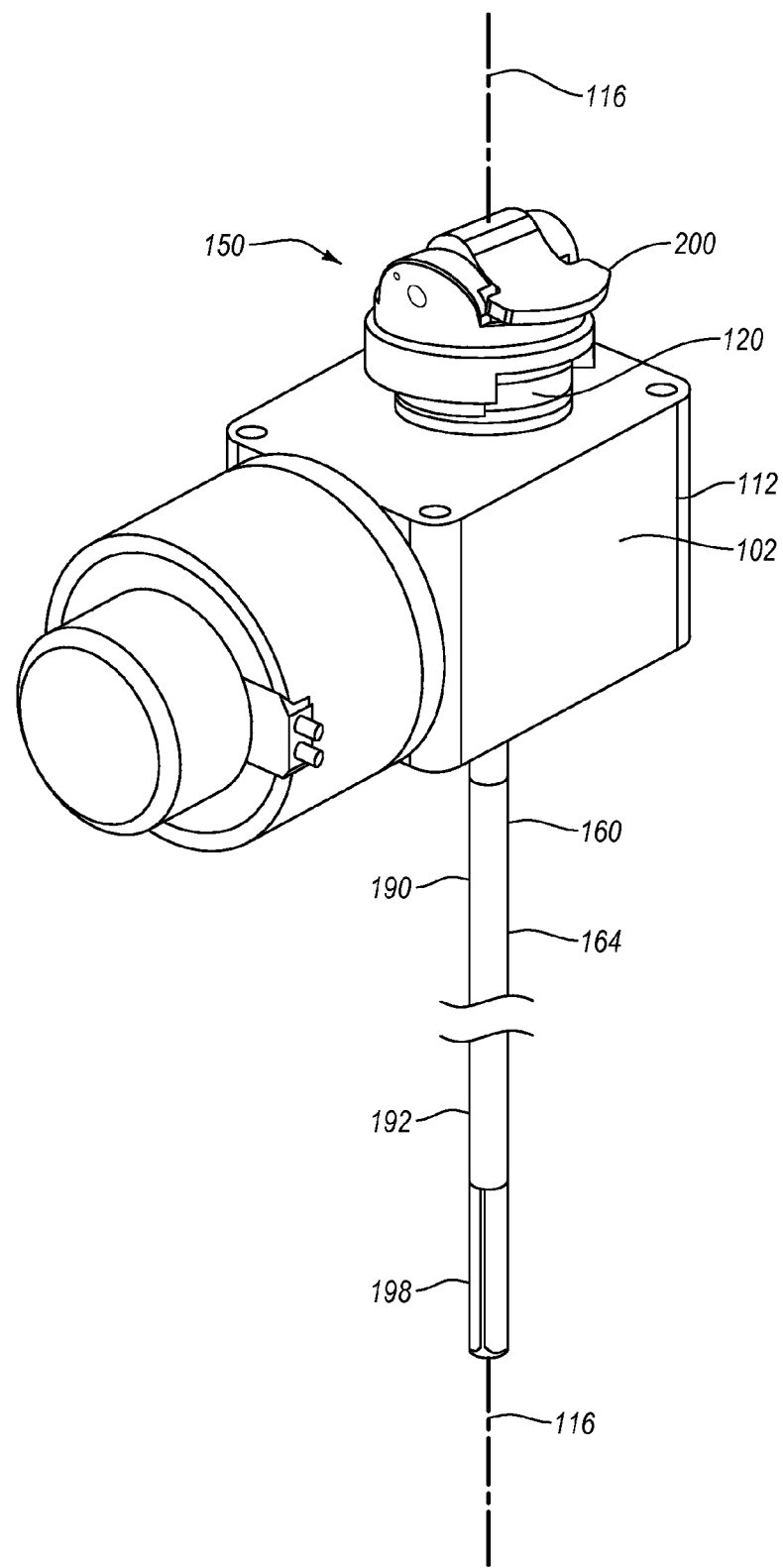
FIG. 3 is a top perspective view of a motor assembly and the drive shaft of the mixing system shown in FIG. 1.
Figure 4:
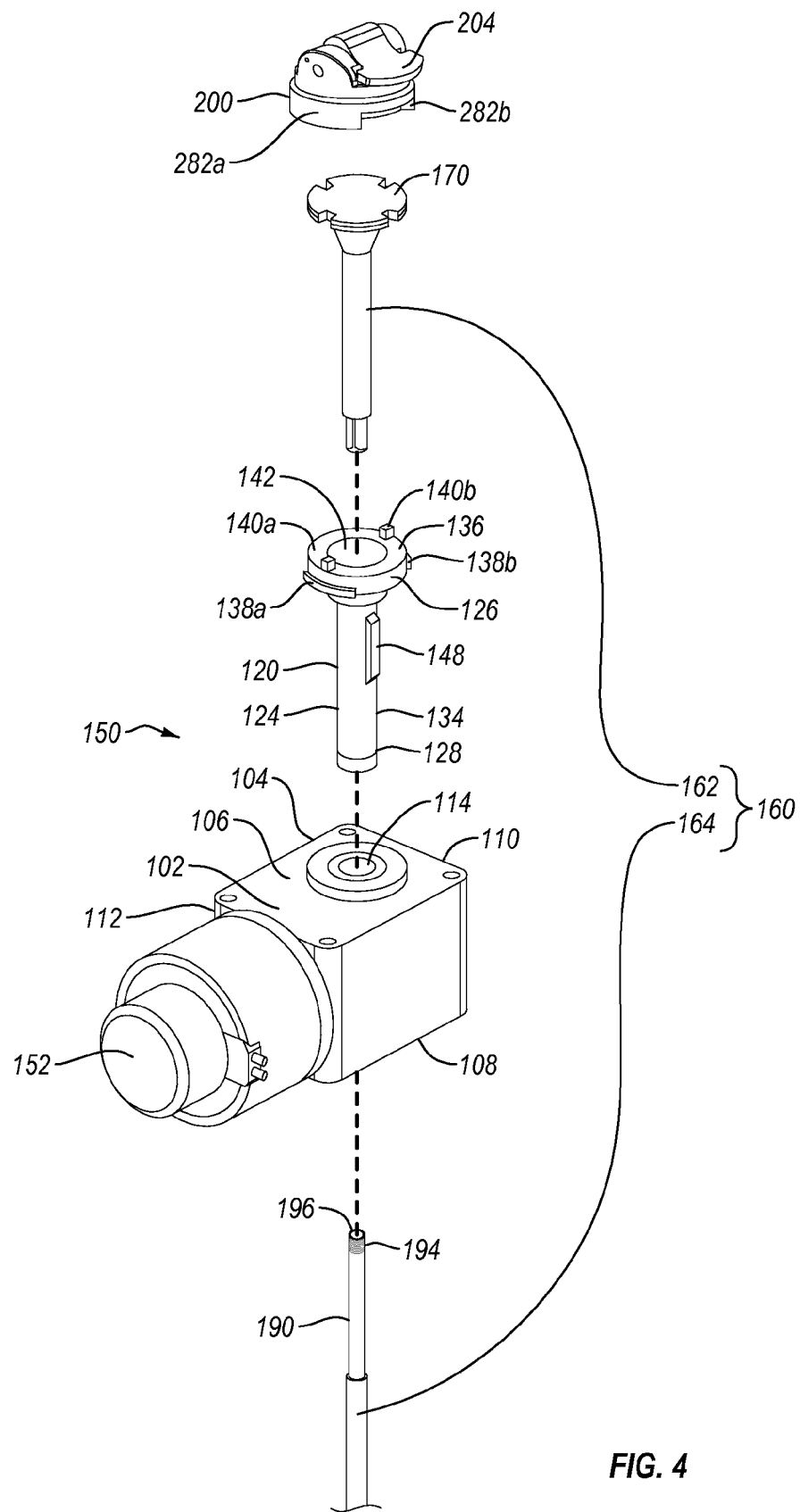
FIG. 4 is an exploded perspective view of the motor assembly and drive shaft shown in FIG. 3.

Depicted in FIGS. 3 and 4 motor assembly 150 includes a housing 102 having a side 112 that extends between a top surface 106 and an opposing bottom surface 108. An opening 114 extends through housing 102 from top surface 106 to bottom surface 108. A tubular motor mount 120 is rotatably secured within opening 114 of housing 102. A drive motor 152 is mounted on side 112 of housing 102. Drive motor 152 engages with stem 134 of motor mount 120 within housing 102 to facilitate select rotation of motor mount 120 relative to housing 102.

Figure 5:
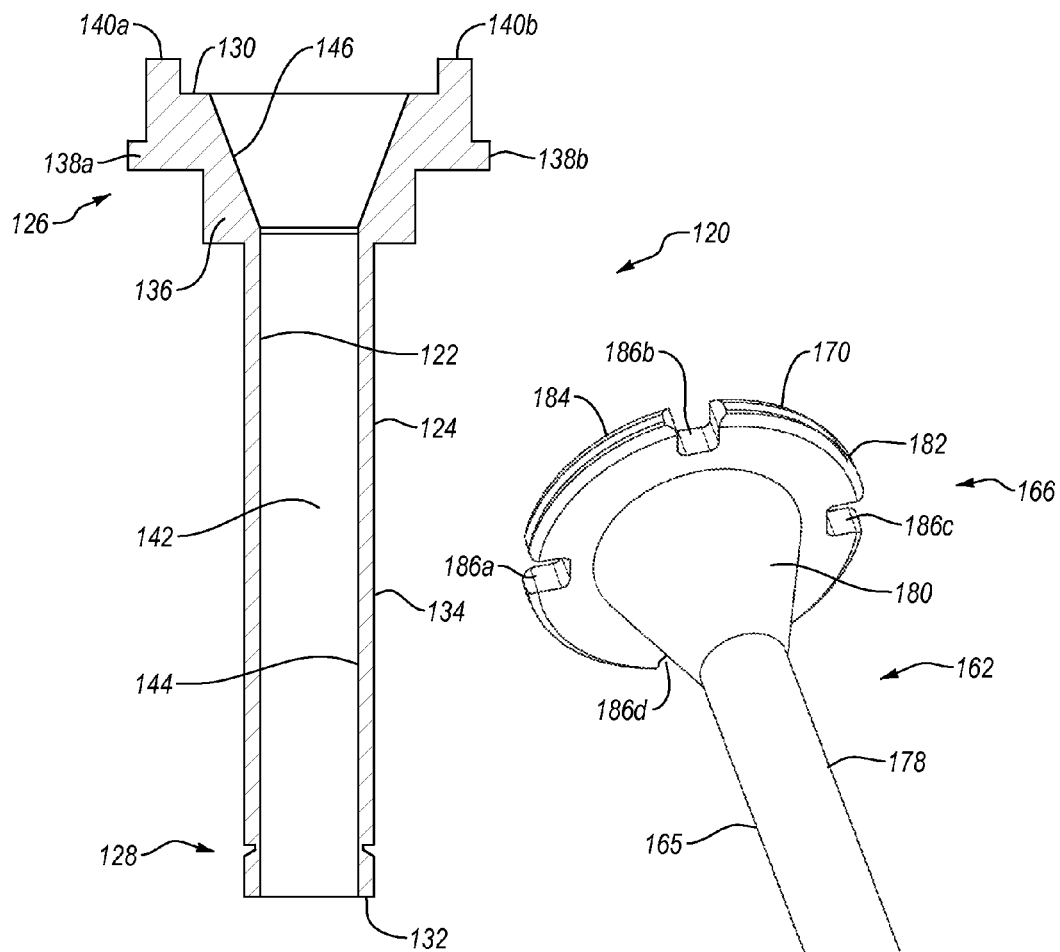
FIG. 5 is a cross sectional side view of the motor mount shown in FIG. 4.

Depicted in FIG. 5, motor mount 120 has an interior surface 122 and an exterior surface 124 each extending between a first end 126 and an opposing second end 128. First end 126 terminates at a first end face 130 while second end 128 terminates at a second end face 132. During use, motor mount 120 is typically positioned in a vertical manner. Thus, first end 126 and first end face 130 may also be referred to herein as top end and top end face or upper end and upper end face. Similar nomenclature may also be used for other components. This is for convenience only to indicate relative directions and is not otherwise intended to limit the scope of the invention or claims.

Motor mount 120 generally comprises an elongated substantially cylindrical stem 134 and an enlarged head 136 formed at first end 126. A pair of spaced apart retainers 138 (138a, 138b) extend radially outward from head 136. As shown in FIG. 4, each retainer 138 can comprise an elongated flange that partially encircles the side wall of head 136. Retainers 138a and 138b are radially opposed to each other, although that is not required. As discussed below in greater detail, retainers 138 are used as an attachment mechanism for attaching a cap to motor mount 120. As such, the size and shape of each retainer 138 can vary as long as retainers 138 can mate with corresponding attachment mechanisms on the cap.

Returning to FIG. 5, a pair of locking pins 140 (140a, 140b) outwardly project from the top surface 130 of head 136. As will be discussed below in greater detail, locking pins 140 can be used to rotationally secure drive shaft 160 to motor mount 120.

Interior surface 122 of motor mount 120 bounds a passage 142 that extends between end faces 130 and 132. Interior surface 122 includes a substantially cylindrical transition portion 144 that extends along the length of stem 134 and a substantially frustoconical engaging portion 146 that extends along head 136. The configuration of engaging portion 146 helps facilitate proper centering of drive shaft 160 and helps minimize or eliminate fret corrosion.

In one embodiment, a rail 148 (FIG. 4) extends outward from exterior surface 124 of stem 134 and is received within a mating channel within opening 114 of housing 102 to assist in rotatably securing motor mount 120 within housing 102. In alternative embodiments, it is appreciated that there are a variety of alternative connection techniques that can be used to rotatably secure motor mount 120 within housing 102.

Figure 6:
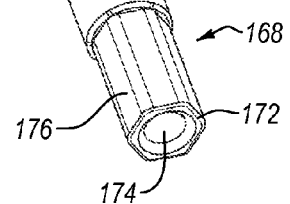
FIG. 6 is an enlarged perspective view of a portion of the drive shaft shown in FIG. 2.

Drive shaft 160 is configured to pass through passage 142 of motor mount 120 and thus through housing 102. As shown in FIG. 2, in one embodiment drive shaft 160 comprises a head section 162 and a shaft section 164 that are connected together, such as by threaded connection. As depicted in FIG. 6, head section 162 has an exterior surface 165 extending between a first end 166 and an opposing second end 168. First end 166 terminates at a first end face 170 while second end 168 terminates at a second end face 172. Recessed into second end face 172 is a threaded socket 174. Head section 162 comprises driver 176 formed at second end 168. Driver 176 has a non-circular transverse cross section that is complementary to the engaging portion of hub 54 of rotational assembly 88 (FIG. 2) so that it can facilitate locking engagement with hub 54 when received therein. In the embodiment depicted, driver 176 has a polygonal transverse cross section. However, other noncircular shapes can also be used.

Extending upward from driver 176 is a substantially cylindrical central portion 178 of head section 162. Extending from central portion 178 is a substantially frustoconical engaging portion 180. Engaging portion 180 has a configuration complimentary to frustoconical engaging portion 146 of motor mount 120 so that engaging portions 146 and 180 can be complementary mated to facilitate contacting engagement between motor mount 120 and drive shaft 160 while centering drive shave 160 within motor mount 120.

Finally, a substantially circular plate section 182 is disposed on engaging portion 180 and forms first end face 170. Plate section 182 extends to a perimeter edge 184 that radially outwardly projects beyond engaging portion 180. A plurality of spaced apart notches 186 (186a-d) are formed on perimeter edge 184. As will be discussed below in greater detail, notches 186 are designed to receive locking pins 140 (FIG. 5) of motor mount 120.

Returning to FIG. 2, shaft section 164 of drive shaft 160 has a first end 190 and an opposing second end 192. First end 190 terminates at a terminus 194 having encircling threads 196 formed thereat. Terminus 194 is configured to be threadedly received within socket 174 of head section 162 so as to rigidly secure head section 162 to shaft section 164, thereby forming drive shaft 160. In alternative embodiments, it is appreciated that there are a variety of alternative connection techniques that can be used to secure head section 162 to shaft section 164. For example, the structures can be connected together by press fit, welding, adhesive, clamps, or other conventional fasteners. The assembled drive shaft 160 thus extends between first end 166 and second end 192. In alternative embodiments, drive shaft 160 can comprise one continuous, unitary shaft or can be comprised of three or more sections that are secured together. Forming drive shaft 160 from multiple sections enable drive shaft 160 to be easily adjusted to different lengths and permits drive shaft 160 to be used in rooms with low ceilings by progressively assembling drive shaft 160 as it is being inserted for use.

Second end 192 of shaft section 164 can terminate at a driver 198 that is used to engage with hub 66 of impeller 86. That is, similar to driver 176 of head section 162 previously discussed, driver 198 has a non-circular transverse cross section that is complementary to the engaging portion of hub 66 of impeller 86 (FIG. 2) so that it can facilitate locking engagement with hub 66 when received therein. In this regard, driver 198 can have any non-circular transverse cross section that is complementary to the interior surface of hub 66. In the embodiment depicted, driver 198 has a polygonal transverse cross section although elliptical, irregular, and other non-circular transverse cross sections will also work. Further discussion and alternative embodiments for drive shaft 160 are disclosed in U.S. Pat. Nos. 7,682,067 and 8,506,198, which are incorporated herein by specific reference.

As depicted in FIG. 1, a capture 117 is formed on the bottom surface of housing 102 of motor assembly 150. Capture 117 is used to removably secure outer casing 50 of rotational assembly 88 to housing 102 so that opening 58 extending through hub 54 (FIG. 2) is aligned with passage 142 extending through motor mount 120 (FIG. 5). In one embodiment, capture 117 can comprise a slot on housing 102 into which casing 50 is received and a hinged gate which is used to lock casing 50 within the slot. Examples of capture 117 and how rotational assembly 88 can be secured to housing 102 are disclosed in U.S. Pat. Nos. 7,682,067 and 8,506,198, which are incorporated herein by specific reference.

With rotational assembly 88 secured to housing 102, second end 192 of the drive shaft 160 can be advanced down through passage 142 of motor mount 120, through hub 54 of rotational assembly 88, through passage 26 of tubular connector 84 and into hub 66 of impeller 86. In this configuration, drive shaft 160 engages with hub 54 of rotational assembly 88 and hub 66 of impeller 86 so that rotation of drive shaft 160 facilitates concurrent rotation of hub 54, tubular connector 84 and impeller 86 relative to container 90.

Figure 7:
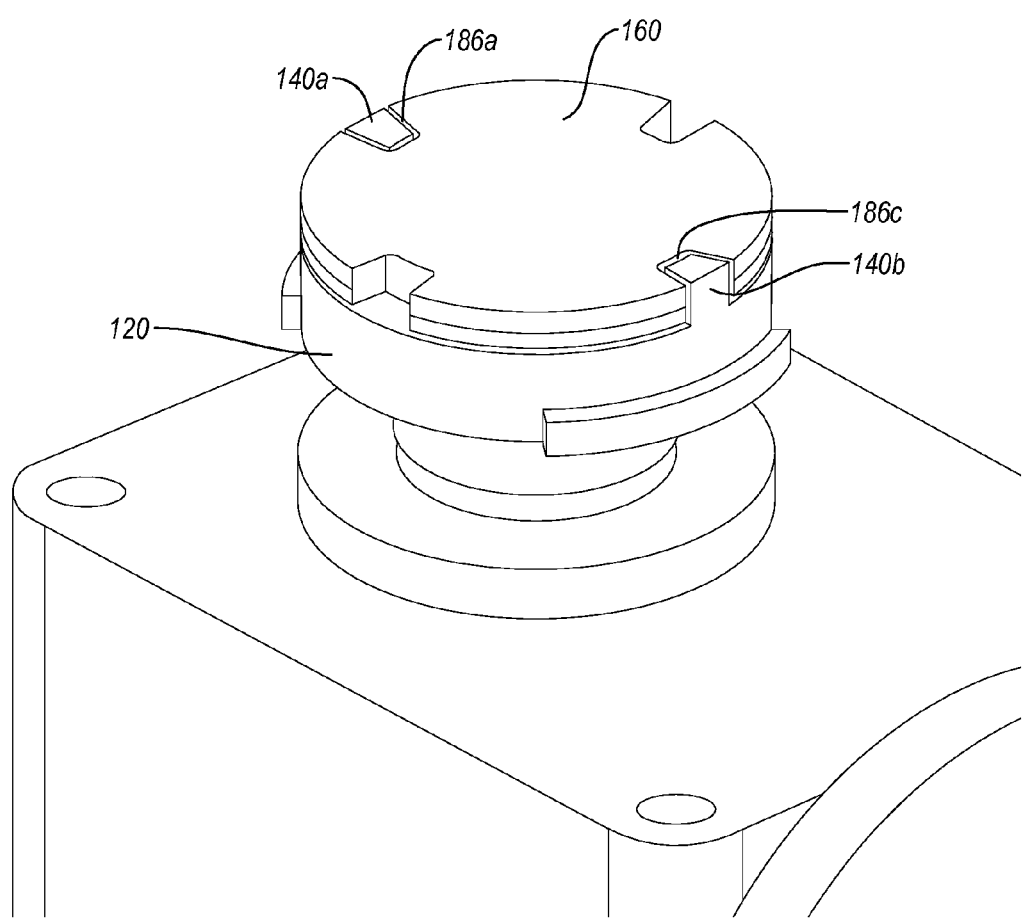
FIG. 7 is a perspective view of the drive shaft coupled with the motor mount.

With reference to FIG. 7, once drive shaft 160 is fully passed through motor mount 120, drive shaft 160 can be oriented so that locking pins 140 of motor mount 120 are received within corresponding notches 186 of drive shaft 160. For example, as shown in FIG. 6, locking pins 140a and 140b can be positioned within notches 186a and 186c. Accordingly, as motor 152 facilitates rotation of motor mount 120, locking pins 140 concurrently rotate with motor mount 120 which in turn facilitate concurrent rotation of drive shaft 160. In turn, rotation of drive shaft 160 facilitates rotation of impeller 86, as discussed above, which facilities mixing of fluid within compartment 92 of container 90.

Although in the embodiments discussed herein locking pins 140 are positioned on motor mount 120 and notches 186 are positioned on drive shaft 160, it should be appreciated that these can be reversed. That is, locking pins 140 can instead be positioned on drive shaft 160 and notches 186 can be formed on motor mount 120, if desired. The term "notch" is broadly interpreted herein to mean any type of opening or recess in which locking pins 140 can be received. In addition, locking pins 140 and notches 186 are only one example of how drive shaft 160 and motor mount 120 can be coupled together. It is appreciated that any type of fastener, pin, clamp, keyway or other engaging structure that will couple drive shaft 160 and motor mount 120 together so that rotation of motor mount 120 will rotate draft shaft 160 can alternatively be used.

With drive shaft 160 received within motor mount 120, frustoconical engaging portion 180 (FIG. 6) of drive shaft 160 is received within frustoconical engaging portion 146 (FIG. 4) of motor mount 120. Engaging portions 180 and 146 have complementary configurations so that a close tolerance fit can be formed therebetween (see, e.g., FIG. 16A). The frustoconical configuration of engaging portions 180 and 146 can help to facilitate proper centering of drive shaft 160 on motor mount 120. Furthermore, repeated rotation of drive shaft 160 can produce micro vibrations on drive shaft 160. A close tolerance fit between engagement portions 180 and 146 can help to prevent fret corrosion between drive shaft 160 and motor mount 120.

To further decrease fret corrosion, engaging portions 180 and 146 can be formed from different materials. Accordingly, in one embodiment head section 162 of drive shaft 160 is formed from a polymeric material whereas motor mount 120 is formed from metal such as stainless steel, aluminum, or the like. In yet other embodiments, various combinations of different materials can be used.

Returning to FIG. 4, once drive shaft 160 is properly seated on motor mount 120, a cap 200 can be removably secured to motor mount 120 and used to selectively lock drive shaft 160 onto first end 126 of motor mount 120 so as to prevent drive shaft 160 from unintentionally disengaging from motor mount 120.

Figure 8A:
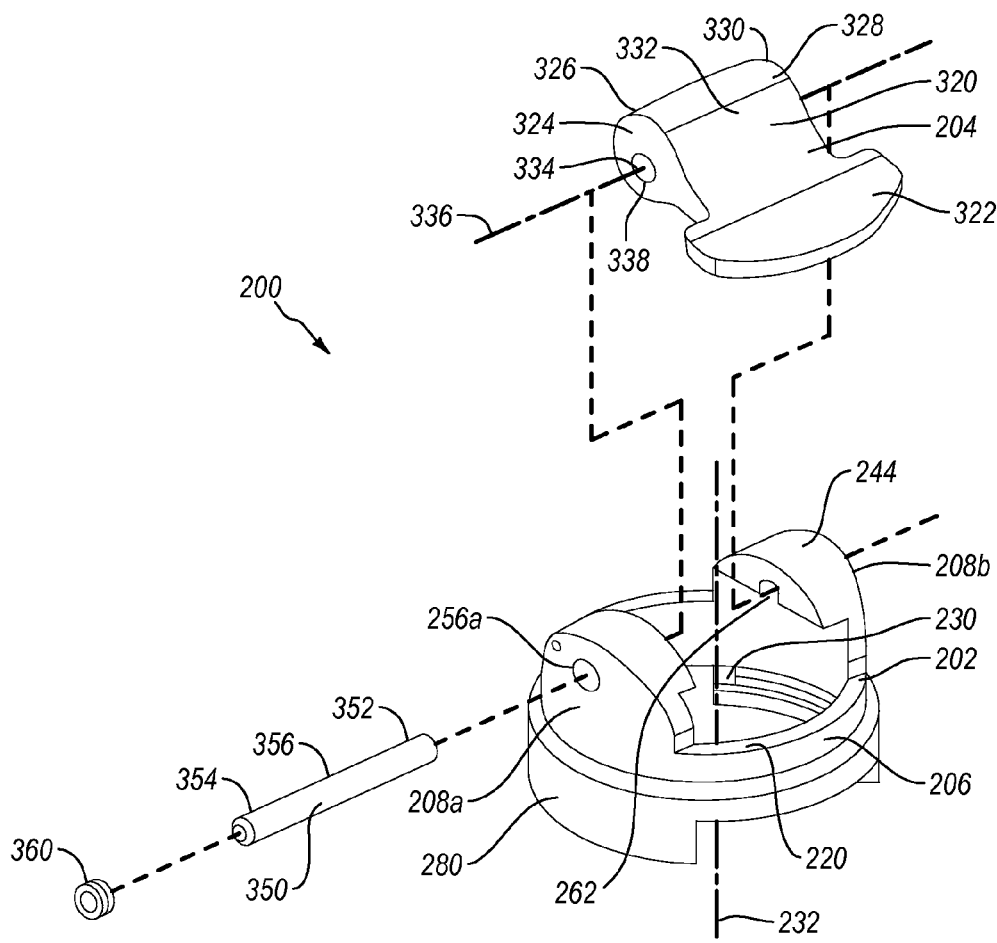
FIG. 8A is an exploded perspective view of the cap shown in FIG. 4.
Figure 8B:
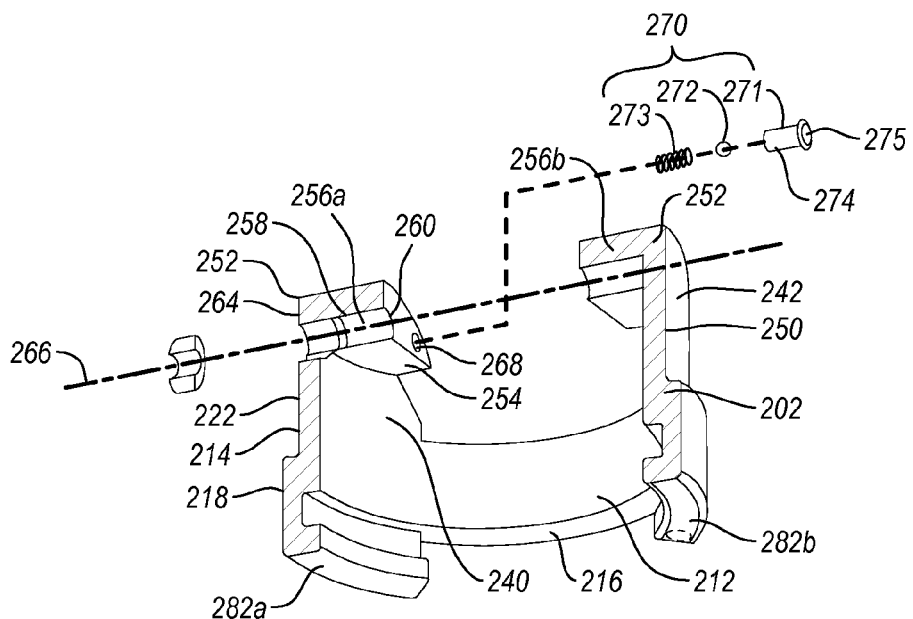
FIG. 8B is an exploded cross sectional view of the main body and the set screw of the cap shown in FIG. 8A.
Figure 9:
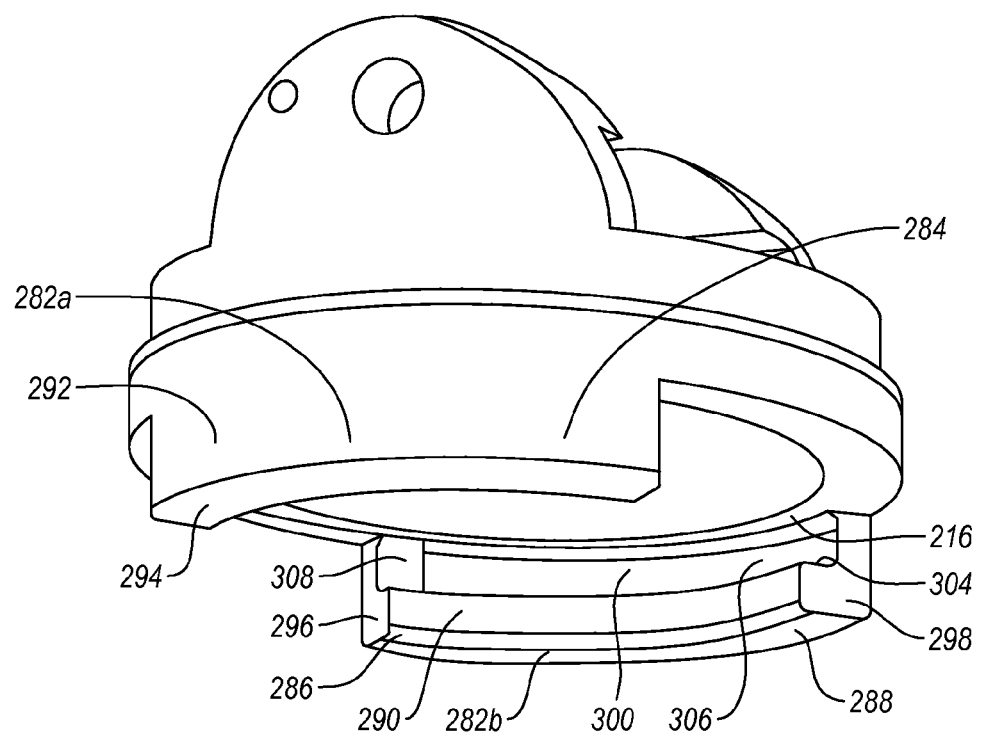
FIG. 9 is a bottom perspective view of the main body of the cap shown in FIG. 8A.

Turning to FIG. 8A, cap 200 comprises a main body 202 and an actuator 204 with various hardware to enable pivoting of actuator 204 with respect to main body 202. Main body 202 comprises a tubular base 206 having a pair of arms 208 (208a, 208b) extending upward therefrom. As shown in FIGS. 8-9, tubular base 206 is circular having an interior surface 212 and an exterior surface 214 that each extend upward from a first end face 216 at a lower end 218 to an opposing second end face 220 at an upper end 222. First and second end faces 216 and 220 are depicted as being substantially flat, although that is not required. Other shapes are also possible. Interior surface 212 bounds a longitudinal passage 230 that extends completely through main body 202 and has a longitudinal axis 232.

Arms 208a and 208b extend upward from upper end 222 on opposing sides of base 206. Each arm 208 has an interior surface 240 and an exterior surface 242 that each extend upward from second end face 220 to a third end face 244. Third end face 244 is depicted as being curved, although that is not required. In some embodiments, third end face 244 can be substantially flat, similar to first and second end faces 216 and 220. Other shapes are also possible.

Arms 208a and 208b are radially opposed to each other across longitudinal passage 230 so that interior surfaces 240 of arms 208a and 208b face each other. As such, interior surfaces 240 of arms 208a and 208b also bound a portion of longitudinal passage 230. In the depicted embodiment, interior and exterior surfaces 240 and 242 of each arm 208 respectively extend from interior and exterior surfaces 212 and 214 of tubular base 206 in a smooth, undisturbed manner. That is, there is no visible incongruity between exterior surfaces 242 of arms 208 and exterior surface 214 of tubular base 206 or between interior surfaces 240 of arms 208 and interior surface 212 of tubular base 206. In other embodiments, surface disturbances and incongruities may exist.

In the depicted embodiment, each arm 208 comprises a lower portion 250 extending upward from tubular base 206 and an upper portion 252 extending upward from lower portion 250. The interior surface of upper portion 252 is inwardly offset from the interior surface of lower portion 250 so that upper portion 252 is substantially transversally thicker than lower portion 250. A bottom-facing ledge 254 extends between the interior surfaces of upper and lower portions 252 and 250 of each arm.

The interior surfaces of upper portions 252 are positioned closer to each other across longitudinal passage 230 such that longitudinal passage 230 is narrower between upper portions 252 of arms 208a and 208b. The increased thickness of upper portions 252 can help actuator 204 provide a stronger clamping force, as discussed in more detail below.

Alternatively or in addition, the exterior surface of upper portion 252 of each arm 208 can extend radially outward to also provide greater thickness. In alternative embodiments, upper portion 252 of each arm 208 can have a thickness that is substantially the same as the thickness of lower portion 250 of the arm.

Each arm 208 includes an aperture 256 (256a, 256b) bounded by an encircling sidewall 258 that extends transversally into the respective arm 208 from a mouth 260 on the respective interior surface 240. As shown in the depicted embodiment, some or all of mouth 260 and corresponding aperture 256 can be positioned on upper portion 252. Each aperture 256 can be totally encircled by sidewall 258 or can be open at one or more portions. For example, in the depicted embodiment each aperture 256 has an open slit or channel 262 extending along a longitudinal portion thereof that prevents sidewall 258 from totally encircling aperture 256 in that portion. Open channel 262 is positioned on ledge 254 so as to allow aperture 256 to communicate with the external environment. Open channel 262 is sized to have a smaller width than aperture 256. That is, the width of channel 262 is smaller than the diameter of aperture 256. In embodiments where the thickness of upper portions 252 are increased, apertures 256 can also be correspondingly longer.

One of the apertures 256a extends completely through arm 208a between interior and exterior surfaces 240 and 242 so that aperture 256a also has a mouth 264 on exterior surface 242. This aperture 256a has a threaded portion extending inward from mouth 264 at exterior surface 242. The other aperture 256b extends only partially through the other arm 208b so that aperture 256b is further bounded by a back wall. In one embodiment, the back wall is aligned with interior surface 240 of lower portion 250.

Apertures 256 are radially opposed across longitudinal passage 230 and aligned with each other so as to be usable to pivotally secure actuator 204 to arms 208, as discussed in more detail below. In one embodiment apertures 256a and 256b are aligned along a transversal axis 266 that is generally orthogonal to longitudinal axis 232 of longitudinal passage 230.

In one embodiment, one or both of arms 208 can include a mounting hole 268 that extends into interior surface 240 of arm 208. Mounting hole 268 is configured to receive a detent 270 that is used to assist in retaining actuator 204 in a desired position. In one embodiment, detent 270 comprises a ball detent that includes a body 271, a ball 272, and a spring 273. Body 274 has an opening 274 which communicates with a constricted inlet 275. Ball 272 can be freely received within opening 274 but is sized so that it can only partially project out through constricted inlet 275. Spring 273 is sized so that it can push ball 272 into constricted inlet 275. Detent 270 is secured within mounting hole 268 by threading, welding, press-fitting, bonding or otherwise securing body 274 within mounting hole 268. In this configuration, spring 273 forces ball 272 to partially project out of constricted inlet 275 and into longitudinal passage 230. Ball 272 extends into longitudinal passage 230 a sufficient distance to cause actuator 204 to come into contact with ball 272 when actuator 204 is pivoted with respect to cap 200. Ball 272 can be resiliently pressed back into opening 274 by resiliently compressing spring 273. As discussed below in more detail, ball 274 helps to retain actuator 204 is a desired position because actuator 204 must overcome the resilient force on ball 272 before actuator 204 can move out of its desired position. It is appreciated that detents come in a variety of different configurations that can equally be used in the present invention. Detent 270 need only have a member that outwardly projects under a resilient force.

Main body 202 further comprises an attachment mechanism 280 configured to removably attach main body 202 to motor mount 120. In the depicted embodiment, attachment mechanism 280 comprises a pair of legs 282 (282a, 282b) that extend downward from tubular base 206. As particularly shown in FIG. 9, each leg 282 comprises a sidewall 284 that is curved between a first end 286 and a second end 288 to follow the circumferential contour of tubular base 206. As such, each sidewall 284 generally forms a downward extension of lower end 218 of tubular base 206. Each sidewall 284 comprises an interior surface 290 and an opposing exterior surface 292 that both extend downward from tubular base 206 to a bottom face 294 and circumferentially between a first end face 296 at the first end 286 and a second end face 298 at second end 288.

Interior surface 290 of sidewall 284 includes a recessed portion that extends into sidewall 284 between first and second ends 286 and 288 to form a locking channel 300. Locking channel 300 is partially bounded by a downward facing ledge 302 and an opposing upward facing ledge 304 that each extend to an inner face 306 recessed in sidewall 284.

Legs 282 and corresponding locking channels 300 are positioned on opposing sides of longitudinal passage 230 so as to be radially opposed to each other. Channels 300 are configured to receive retainers 138 of motor mount 120 using a twisting action to attach cap 200 to motor mount 120. A stop 308 can be positioned at an end of any locking channel 300 to prevent retainers 138 from unintentionally exiting the end of a corresponding locking channel 300 once received therein.

Returning to FIG. 8A, actuator 204 comprises a cam 320 and a handle 322 extending therefrom. Cam 320 comprises a first end face 324 having a first perimeter edge 326 and an opposing second end face 328 having a second perimeter edge 330. A curved camming surface 332 extends between first and second perimeter edges 326 and 330. A throughhole 334 extends completely through cam 320 along a longitudinal axis 336 between mouths 338 on first and second end faces 324 and 328. In one embodiment, throughhole 334 has a diameter that is substantially the same as the diameter of apertures 256 that extend transversally into arms 208.

Figure 10:
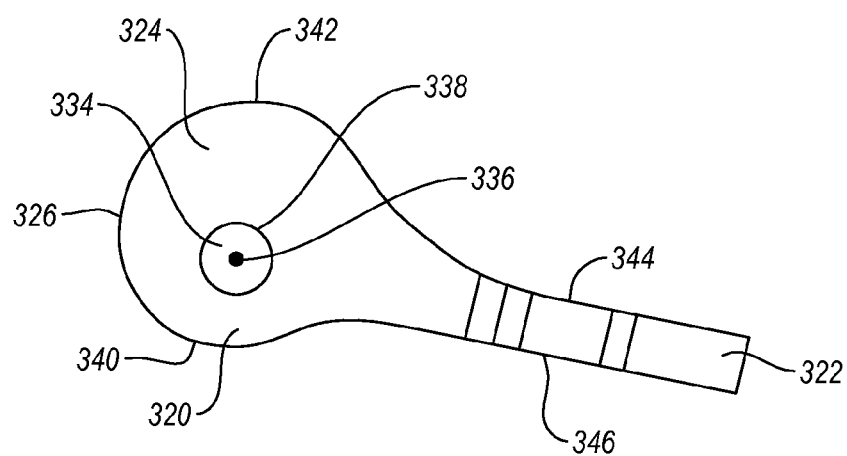
FIG. 10 is a side plan view of the actuator shown in FIG. 8A.

Turning to FIG. 10 in conjunction with FIG. 8A, camming surface 332 has an asymmetrical curvature relative to axis 336. Specifically, throughhole 334 is positioned closer to perimeter edge 326 on a first side 340 of camming surface 332 than on an opposing second side 342 of camming surface 332. In other terms, the radius from axis 336 to camming surface 332 gradually increase from first side 340 to second side 342. In light of this, when longitudinal axis 336 is used as a pivot axis about which actuator 204 is pivoted, cam 320 produces a camming action, as discussed in more detail below.

Handle 322 comprises a first side surface 344 and an opposing second side surface 346 that extend from cam 320 in a direction that is generally perpendicular to longitudinal axis 336. Handle 322 is used to rotate cam 320 about pivot axis 336, as discussed in more detail below. As such, handle 322 can include grip aids on the first and/or second side surfaces 344, 346 to aid in the gripping of handle 322. For example, handle 322 can include gripping material attached to either of the side surfaces and/or patterns etched into either of the side surfaces, if desired. Handle 322 can be integrally formed with cam 320, as in the depicted embodiment, or can be attached to cam 320 using a fastener or the like.

Returning to FIG. 8A, to pivotably attach actuator 204 to main body 202, actuator 204 is first positioned in longitudinal passage 230 between arms 208a, and 208b of main body 202 so that throughhole 334 becomes aligned with apertures 256 of arms 208. A rod 350 can then be used to couple actuator 204 to main body 202. Rod 350 has a first end 352 and a second end 354 with a middle portion 356 extending longitudinally therebetween.

Figure 11:
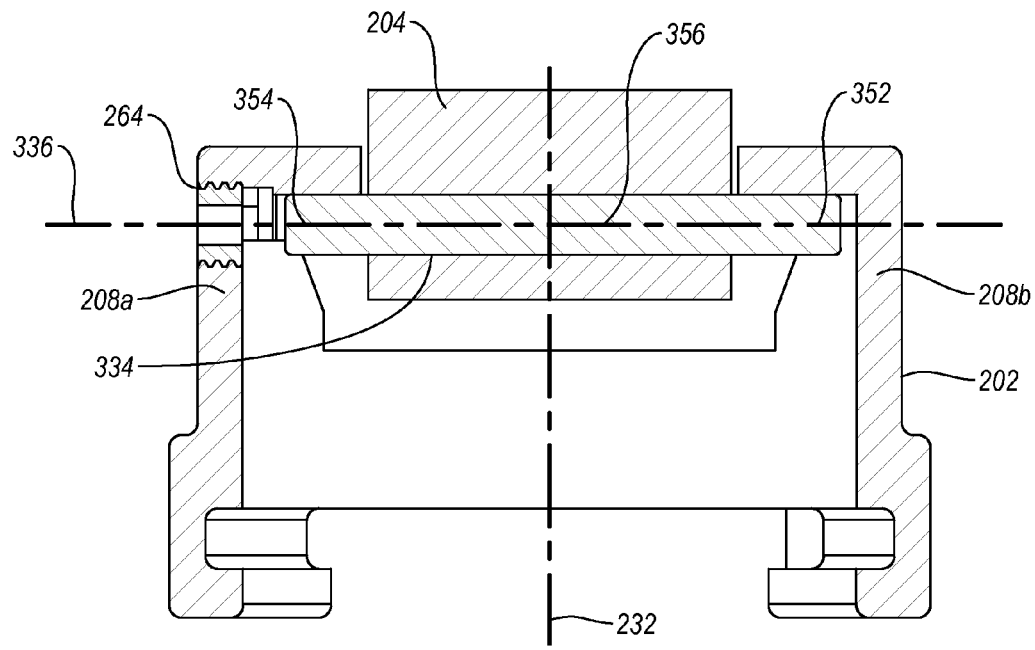
FIG. 11 is a cross sectional front view of the assembled cap of FIG. 8A with the actuator in the open position.

First end 352 of rod 350 is inserted through mouth 264 and into aperture 256a of first arm 208a. Rod 350 is further inserted into aperture 256a so that first end 352 passes through throughhole 334 of actuator 204 and into aperture 256b of second arm 208b, as shown in FIG. 11. In this position, ends 352 and 354 of rod 350 are positioned within apertures 256a and 256b of arms 208a and 208b, which results in actuator 204 being coupled to main body 202 within longitudinal passage 230. Actuator 204 will remain coupled to main body 202 while both ends 352 and 354 of rod 350 remain positioned in apertures 256 of arms 208. Because throughhole 334 of cam 320 is aligned with apertures 256 of arms 208, longitudinal axis 336 of cam 320 is aligned with transversal axis 266. As a result, longitudinal axis 336 is generally orthogonal to the longitudinal axis 232 of longitudinal passage 230.

Returning to FIG. 8A, a retaining device, such as, e.g., a set screw 360 or the like, can be used to retain rod 350 within apertures 256 and throughhole 334. Mating threads can be positioned on set screw 360 and mouth 264 of aperture 256 so that set screw 360 can be threaded into and secured within aperture 256 in any manner known in the art to thereby retain rod 350 within apertures 256 and throughhole 334. In similar manner, to remove rod 350 from apertures 256 and throughhole 334, set screw 360 can be unscrewed from aperture 256. Other types of retaining devices can alternatively be used, such as fasteners, adhesives, and the like. Furthermore, rod 350 can be press fit into aperture 250, directly threaded into aperture 250 or otherwise secured in aperture 250.

Once actuator 204 has been coupled to main body 202, e.g., such as in one of the manners discussed above, actuator 204 can be pivoted with respect to main body 202 about longitudinal axis 336, with rod 350 acting as the pivot. Pivoting of actuator 206 with respect to main body 202 can be accomplished in a number of ways. For example, rod 350 can be rigidly attached to main body 202 but not to arms 208 so that actuator 204 can pivot about the stationary rod. Alternatively, rod 350 can be rigidly attached to actuator 204 but not to arms 208 so that rod 350 (and rigidly attached actuator 204) can be rotatable within apertures 256 of arms 208. Another option is to have rod 350 not be rigidly attached to either main body 202 or actuator 204 so that both rod 350 and actuator 204 can independently pivot relative to body 202.

Regardless, in all three options, actuator 204 effectively pivots about longitudinal axis 336, with rod 350 acting as the pivot. And, as discussed above, longitudinal (i.e., pivot) axis 336 is generally orthogonal to longitudinal axis 232 of longitudinal passage 230.

Figure 12:
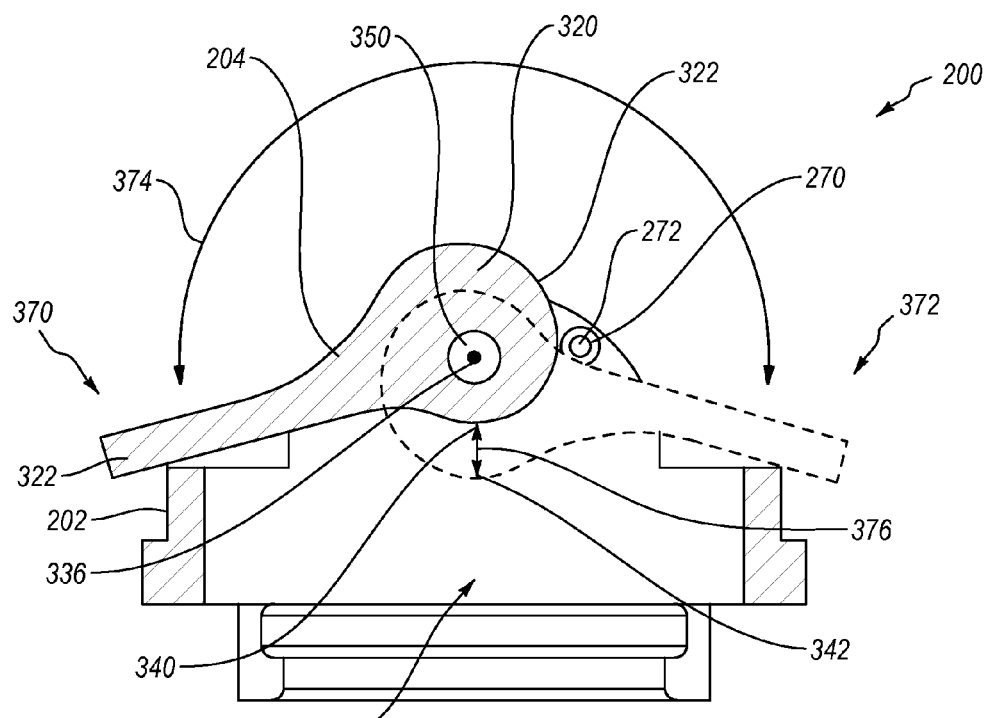
FIG. 12 is a cross sectional side view of the assembled cap of FIG. 8A, showing the pivoting of the actuator between the open and closed positions.

FIG. 12 shows assembled cap 200 with actuator 204 in two different positions. The first position 370 of actuator 204, also referred to herein as the open position, is shown in solid lines, while the second position 372, also referred to herein as the closed position, is shown in dashed lines. Handle 322 can be used to pivot actuator 204 between the two positions about pivot axis 336, as shown by arrow 374. As actuator 204 is pivoted, cam 320 correspondingly pivots so that a different portion of cam 320 becomes the bottommost portion of cam 320.

For example, as depicted in FIG. 12, when actuator 204 is in open position 370, first side 340 is the bottommost portion of cam 320 and when actuator is pivoted to closed position 372, second side 342 becomes the bottommost portion. Thus, due to the offset of pivot axis 336, pivoting of actuator 204 produces a camming action, causing camming surface 332 at the changing bottommost portion to effectively move up or down in passage 230, as depicted by arrow 376. Put another way, camming surface 322 of cam 320 progressively extends further downward into passage 230 as actuator 204 is pivoted from open position 370 to closed position 372. Furthermore, the bottommost portion of cam 320 always extends the same distance into passage 230 each time the actuator is moved to the closed position.

Figure 13:
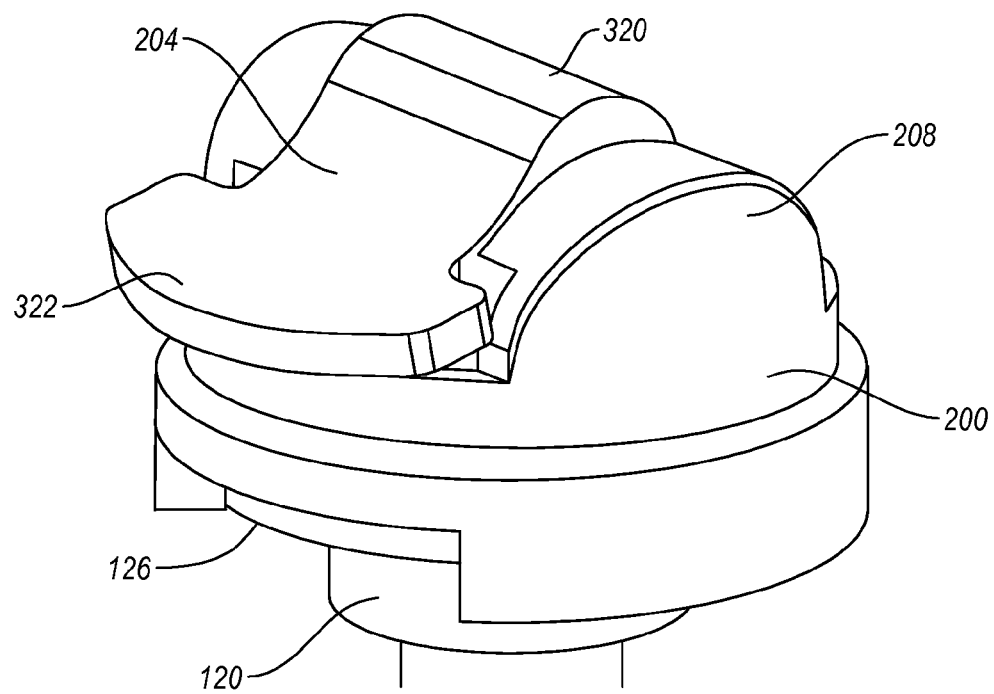
FIGS. 13 and 14 are top perspective view of a portion of the system shown in FIGS. 3 and 4, with the actuator respectively in the open and closed positions.
Figure 14:
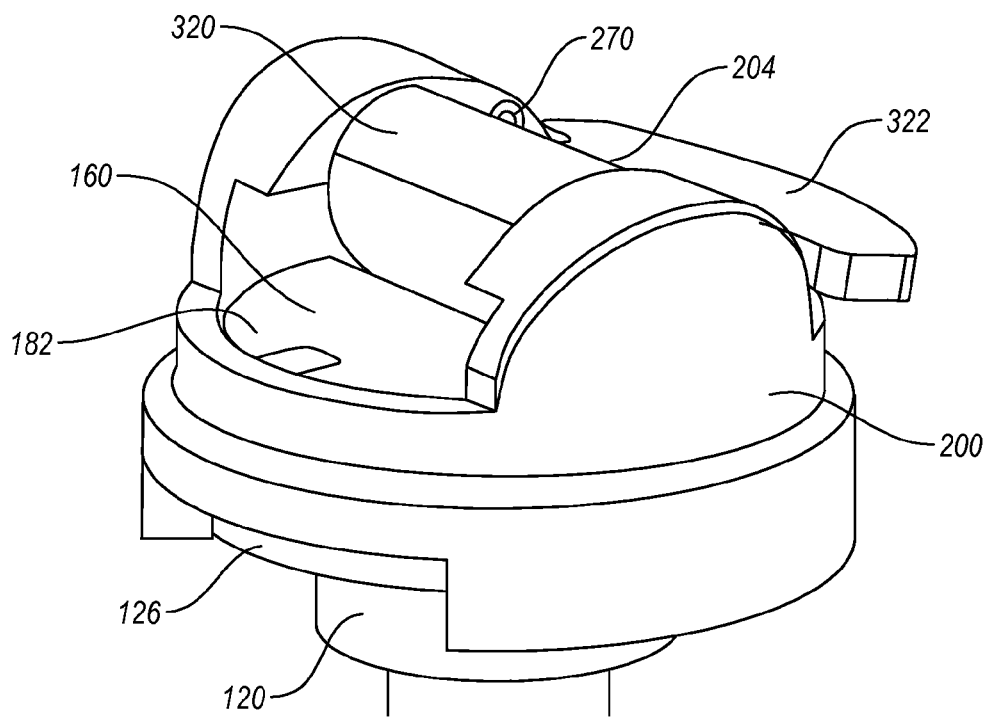

As shown in FIGS. 13 and 14, assembled cap 200 can be removably secured to motor mount 120 and used to selectively lock drive shaft 160 onto first end 126 of motor mount 120 so as to prevent drive shaft 160 from unintentionally disengaging from motor mount 120. FIGS. 13 and 14 depict the attached cap 200 with actuator 204 respectively in the open and closed positions. Before attaching cap 200 to motor mount 120, actuator 204 is first pivoted about pivot axis 336 to the open position to position the bottommost portion of cam 320 as far upward as possible.

To secure cap 200 to motor mount 120, initially drive shaft 160 is first rotated, if required, about rotational axis 116 until notches 186 of drive shaft 160 are aligned with locking pins 140 of motor mount 120, as shown in FIG. 7. In this position, drive shaft 160 can be pushed downward so that locking pins 140 are received within notches 186. Mating attachment mechanisms on cap 200 and motor mount 120 are used to secure the two together. In the depicted embodiment shown in FIG. 4, the attachment mechanisms comprise legs 282 on cap 200 and retainers 138 on motor mount 120. With actuator 204 in the open position, cap 200 is lowered over motor mount 120 such that legs 282 and retainers 138 are side by side (i.e., at the same horizontal level but not attached). In this side-by-side position, locking channels 300 (FIG. 9) of legs 282 are aligned with retainers 138. Cap 200 can then be rotated with respect to motor mount 120 about longitudinal axis 116 to cause locking channels 300a and 300b to receive retainers 138a and 138b. Cap 200 can be rotated until one of retainer 138 comes into contact with stop 308 (FIG. 9).

In alternative embodiments, it is appreciated that the attachment mechanisms for cap 200 and motor mount 120 can be reversed. For example, locking channels 300 could be recessed on motor mount 120 while complementary retainers 138 could be formed so as to inwardly project from legs 282 on cap 200.

Figure 15A:
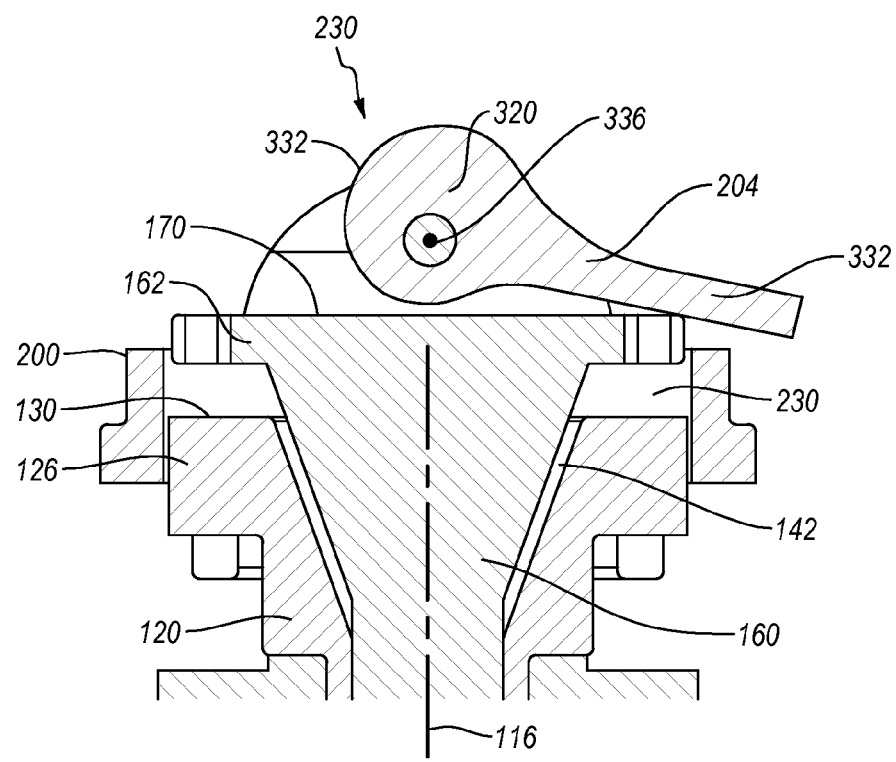
FIGS. 15A and 15B are cross sectional side views of the system shown in FIGS. 3 and 4, with the actuator in the open position as shown in FIG. 13.
Figure 15B:
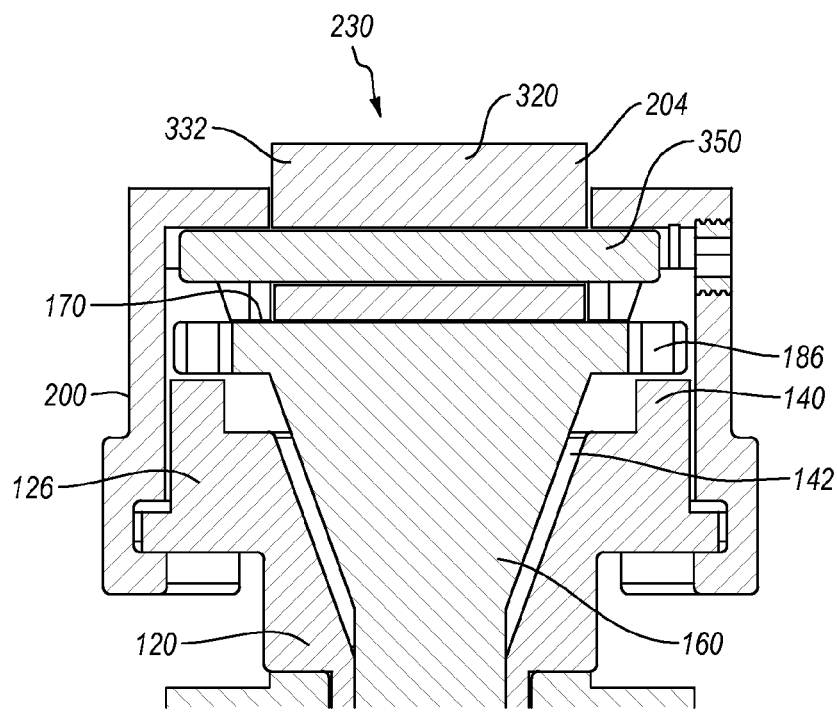

FIGS. 15A and 15B depict cap 200 and motor mount 120 in this originally attached position. As shown, a portion of motor mount 120 is positioned within longitudinal passage 230 of cap 200 and drive shaft 160 is positioned within motor mount 120 such that head section 162 extends upward beyond first end face 130 of motor mount 120. Actuator 204 is in the open position so that first end face 170 of drive shaft 160 is not being pushed downward by camming surface 332 of cam 320. In this position, drive shaft 160 has some space to move vertically within passage 142 of motor mount 120 so that very little, if any, pressure or friction is present between cam 320 and drive shaft 160. This allows cap 200 to be easily rotated by hand about rotational axis 116 to position the mating portions of the attachment mechanisms. As such, no tools are required for attaching cap 200 to motor mount 120.

Figure 16A:
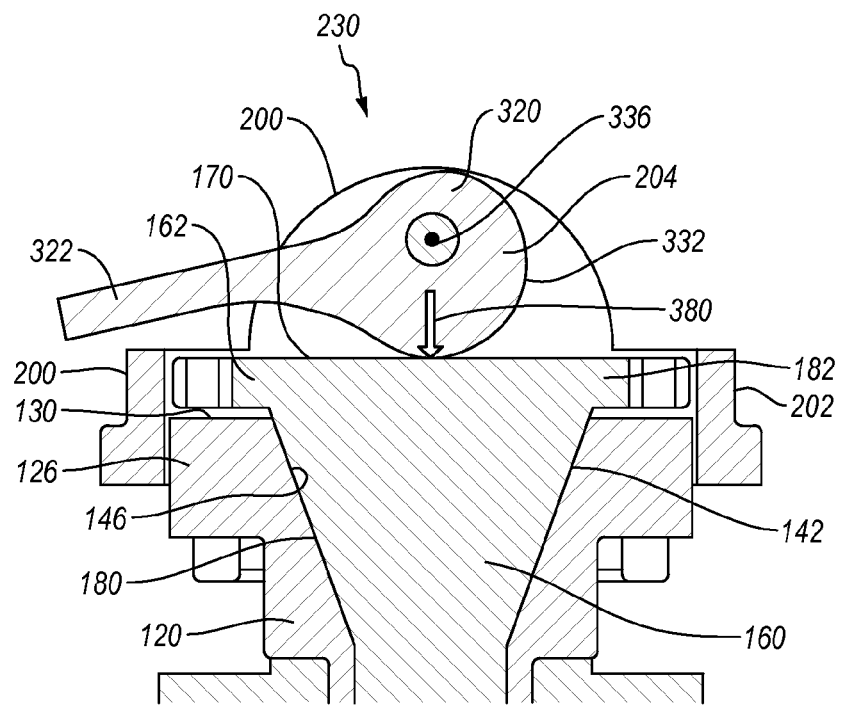
FIGS. 16A and 16B are cross sectional side views of the system shown in FIGS. 3 and 4, with the actuator in the closed position as shown in FIG. 14.
Figure 16B:
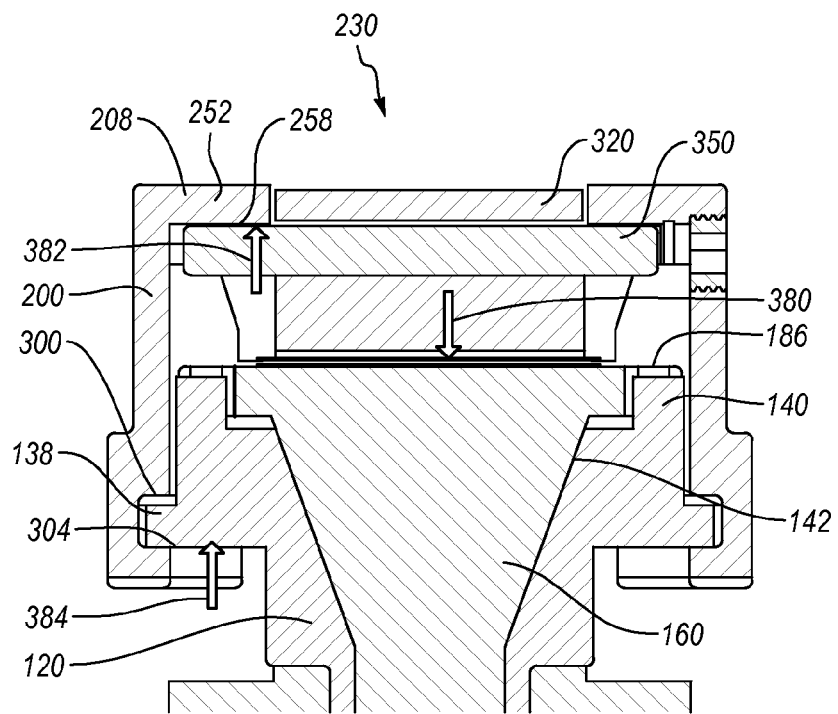

To lock drive shaft 160 onto first end 126 of motor mount 120, actuator 204 is then pivoted about pivot axis 336 to the closed position by manual manipulation of handle 372. As such, actuator 204 can be moved to the closed position without the use of tools. FIGS. 16A and 16B depict cap 200 and motor mount 120 when actuator 204 is in the closed position. As discussed above, pivoting of actuator 204 about pivot axis 336 from the open position to the closed position produces a camming action that causes camming surface 332 of cam 320 to move downward into longitudinal passage 230. As a result, camming surface 332 of cam 320 comes into contact with first end face 170 of drive shaft 160 and pushes drive shaft 160 downward toward first end face 130 of motor mount 120 as depicted by arrow 380. This downward force causes locking pins 140 to become secured within notches 186, thereby locking drive shaft 160 to motor mount 120.

As discussed above, the bottommost portion of cam 320 moves substantially the same distance downward into longitudinal passage 230 every time actuator 204 is moved to the closed position. As a result, the downward force 380 caused by cam 320 is generally the same each time actuator 204 is in the closed position. This provides a consistent securing force each time cap 200 is used.

The downward force 380 causes drive shaft 160 to move downward until engaging portion 180 and/or plate section 182 of drive shaft 160 contact and push against engaging portion 146 and/or first end face 130 of motor mount 120. This also causes cam 320 to push upwards against rod 350 which causes rod 350 to push entire main body 202 of cap 200 upwards with respect to motor mount 120, as depicted by arrow 384. As a result, the bottom ledges 304 of body 202 pushes upward against retainers 138 within of channels 300. This upward push 384 of bottom ledges 304 against retainers 138 causes cap 200 and motor mount 120 to be securely locked together by frictional engagement. Thus, pivoting actuator 204 to the closed position causes both drive shaft 160 and cap 200 to become locked to motor mount 120. When actuator 204 is in the closed position, drive shaft 160 and cap 200 are secured to motor mount 120 so as to rotate therewith as motor mount 120 rotates about rotational axis 116.

Because of the design of cap 200, the applied locking force is substantially the same each time actuator 204 is moved to the closed position. This consistent force prevents "under" and "over" tightening that can occur in conventional systems. As a result, there is less likelihood of cap 200 becoming unintentionally loosened during operation of the system. Furthermore, because in one embodiment the securing mechanism and the actuator do not use threaded connections, there are no threads that can become misaligned or otherwise damaged, as with conventional systems. In addition, because cap 200 can be manually attached to motor mount 120 and actuator 204 can be manually moved between the open and closed position, no tools are required for mounting cap 200.

If desired, detent 270, as previously discussed, can be used to aid in keeping actuator 204 from pivoting out of the closed position. For example, as shown in FIGS. 8B and 12, once actuator 204 is in the closed position, ball 272 of detent 270 sufficiently projects into passage 230 so that actuator 204 can only pivot about pivot axis 336 back to the open position by resiliently compressing ball 272 back into opening 274. The spring force applied to ball 272 is thus set sufficiently high so that actuator 204 cannot unintentionally pivot from the closed position to the open position during defined operating conditions. However, by applying sufficient force, the operator is able to manually move actuator 204 from the closed position to the open position. In an alternative embodiment, detent 270 can be replaced with a pin that is inserted into mounting hole 268 after actuator 204 is moved to the closed position and then must be removed from mounting hole 268 before actuator 204 can be moved back to the open position.

To remove cap 200 from motor mount 120, a generally opposite process can be used. For example, in one embodiment, actuator 204 is first pivoted from the closed position (FIGS. 16A-16B) back into the open position (FIGS. 15A-15B) by manual manipulation of handle 322. Cap 200 can then again be freely rotated about rotational axis 116 with respect to motor mount 120, but in an opposite direction, to disengage retainers 138 from channels 300. Cap 200 can then be lifted off motor mount 120. This can allow drive shaft 160 to be removed from motor mount 120. Thus, cap 200 can be easily removed from motor mount 120 without a tool.

It is appreciated that the elements of mixing system can be used in a variety of different ways and have a variety of different configurations. For example, as depicted in FIGS. 1 and 2, impeller assembly is disclosed as including connector 84, rotational assembly 88 and impeller 86. In alternative embodiments, rotational assembly 88 could be excluded from the impeller assembly. In this embodiment, tubular connector could be connected directly to drive shaft 160 such as by a clamp or other fastener. In still other embodiments, the impeller assembly may only comprise impeller 86 that is mounted to drive shaft 160. In the above and other embodiments, container 90 comprises an open top polymeric liner that is supported within a support housing or an open rigid container.

Figure 17:
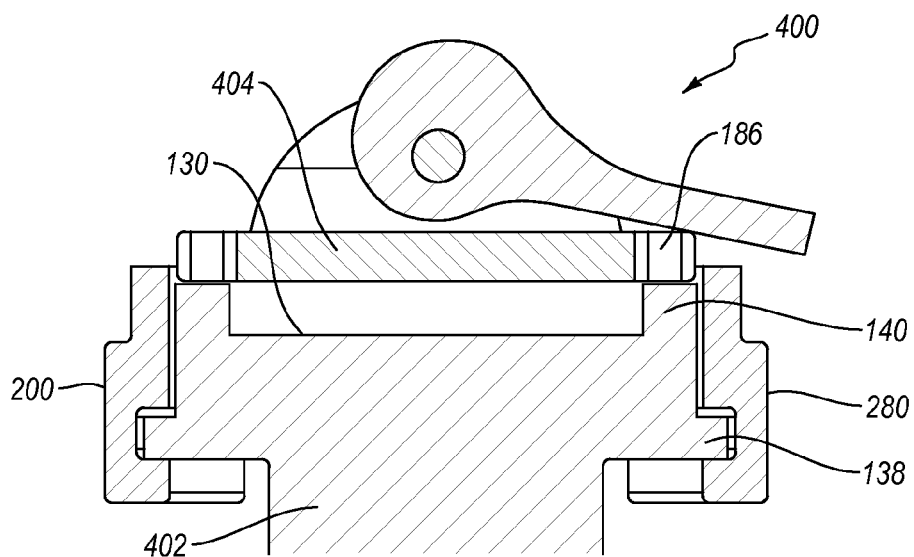
FIGS. 17 and 18 are cross sectional side views of another embodiment of a locking system with the actuator respectively in the open and closed positions.
Figure 18:
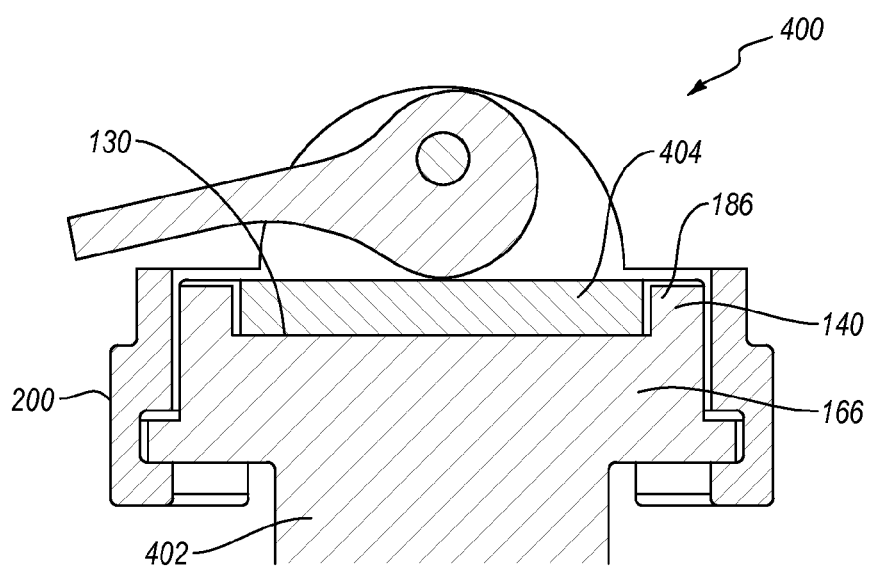

Embodiments of the present invention can also be used to secure other devices besides drive shafts to motor mounts. For example, FIGS. 17 and 18 depict a portion of a rotational system 400 having a motor mount 402 in which a device 404 lacking an elongated drive shaft can be secured by cap 200. Device 404 is similar to the circular plate section 182 of drive shaft 160, similarly having notches 186. Without an elongated drive shaft, however, device 404 can remain atop motor mount 402. As a result, motor mount 402 does not include a passage extending therethrough; instead, first end face 130 can extend over the center portion of first end 166 of motor mount 402. Similar to motor mount 120, motor mount 402 also includes locking pins 140 that are received within notches 186 of device 404.

As with the above embodiments, assembled cap 200 can be removably secured to motor mount 402 and used to selectively lock device 404 onto first end 126 of motor mount 402 so as to prevent device 404 from unintentionally disengaging from motor mount 402. This can be accomplished in a similar manner as discussed above with rotational system 100. That is, actuator 204 can be pivoted to the open position, cap 200 can be lowered over motor mount 402 and secured thereto using the attachment mechanisms 138 and 280, as shown in FIG. 17. Actuator 204 can then be pivoted to the closed position, as shown in FIG. 18, to cause locking pins 140 to be received within notches 186 and to cause device 404 to push against motor mount 402 to selectively lock device 404 onto first end 126 of motor mount 402.

Although the embodiments discussed herein have been directed to securing drive shafts and other devices to a rotatable motor mount, other embodiments are also envisioned. For example, instead of a motor mount, any other mount can be used. That is, a cap according to embodiments of the invention can be used to secure a device to any type of mount, if desired, as long as the mount has an attachment mechanism that can mate with the attachment mechanism of the cap.

As discussed above, various alternatives for different components of mixing system 10 are disclosed in U.S. Pat. Nos. 7,682,067 and 8,506,198, which, as noted above, have been incorporated herein. As such, the various components between the different references can be mixed and matched to obtain a variety of other alternative embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   inserting a drive shaft into a passage of a tubular motor mount;
   attaching a cap to the motor mount, the cap comprising:
   a body having an interior surface that bounds a passage extending through the body;
   an actuator pivotably coupled to the body, the actuator having a cam comprising a curved camming surface and being pivotable relative to the body between a first position and a second position, the curved camming surface extending further downward into the passage of the body when the actuator is in the second position than when the actuator is in the first position; and
   pivoting the actuator of the cap from the first position to the second position so that the cam of the actuator pushes the drive shaft against the motor mount so as to lock the cap to the motor mount and so that rotation of the motor mount causes rotation of the drive shaft.

2. The method recited in claim 1, wherein attaching the cap to the motor mount comprises rotating the cap with respect to the motor mount.

3. The method recited in claim 2, wherein rotating the cap with respect to the motor mount causes retainers extending outward from an outer surface of the motor mount to be received within locking channels on a main body of the cap to attach the cap to the motor mount.

4. The method recited in claim 1, wherein the step of inserting the drive shaft comprises positioning a locking pin on one of the drive shaft or the motor mount within a notch on the other one of the drive shaft or the motor mount.

5. The method recited in claim 1, further comprising rotating the motor mount while the actuator is in the second position so as to cause the drive shaft and cap to concurrently rotate therewith.

6. The method recited in claim 1, further comprising coupling an impeller to the drive shaft.

7. The method recited in claim 1, further comprising using the drive shaft to mix a culture of cells or microorganisms within a compartment of a container.

8. The method recited in claim 1, wherein the actuator is at least partially disposed within the passage extending through the body.

9. The method recited in claim 1, wherein the cam has a pivot axis extending therethrough about which the actuator pivots, and the curved camming surface extends asymmetrically about the pivot axis.

10. The method recited in claim 1, wherein the cap comprises a first attachment mechanism and the motor mount comprises a second attachment mechanism, the first attachment mechanism being releasably attached to the second attachment mechanism to secure the cap to the motor mount when the cap is attached to the motor mount.

11. The method recited in claim 10, wherein the first attachment mechanism comprises opposing locking channels formed on the body of the cap and the second attachment mechanism comprises retainers outwardly extending from an outer surface of the motor mount, the retainers being received within the locking channels to attach the cap to the motor mount.

12. The method recited in claim 10, wherein the first and second attachment mechanisms are configured such that a twisting action is used to attach the cap to the motor mount.

13. The method recited in claim 1, wherein one of the drive shaft and the motor mount has a notch and the other of the drive shaft and the motor mount comprises a locking pin that is receivable within the notch, the locking pin being received within the notch when the actuator is in the first position.

* * * * *